United States Patent
Takashima et al.

(10) Patent No.: US 10,115,051 B2
(45) Date of Patent: Oct. 30, 2018

(54) HUMIDITY SENSOR, WIRELESS DEVICE INCLUDING THE SAME, AND METHODS OF MAKING AND USING THE SAME

(71) Applicants: Mao Takashima, Cupertino, CA (US); Aditi Chandra, Los Gatos, CA (US)

(72) Inventors: Mao Takashima, Cupertino, CA (US); Aditi Chandra, Los Gatos, CA (US)

(73) Assignee: Thin Film Electronics ASA, Oslo (NO)

( * ) Notice: Subject to any disclaimer, the term of this patent is extended or adjusted under 35 U.S.C. 154(b) by 112 days.

(21) Appl. No.: 15/226,671

(22) Filed: Aug. 2, 2016

(65) Prior Publication Data
US 2017/0038325 A1    Feb. 9, 2017

Related U.S. Application Data

(60) Provisional application No. 62/201,789, filed on Aug. 6, 2015.

(51) Int. Cl.
*G06K 19/07* (2006.01)
*G06K 19/077* (2006.01)

(52) U.S. Cl.
CPC ... *G06K 19/07779* (2013.01); *G06K 19/0702* (2013.01); *G06K 19/0717* (2013.01)

(58) Field of Classification Search
None
See application file for complete search history.

(56) References Cited

U.S. PATENT DOCUMENTS

| | | | | |
|---|---|---|---|---|
| 6,574,166 B2 * | 6/2003 | Niemiec | ............... | A61J 7/0481 |
| | | | | 206/531 |
| 7,222,531 B2 * | 5/2007 | Isogai | .................. | G01N 27/223 |
| | | | | 73/335.02 |
| 7,948,381 B2 | 5/2011 | Lindsay et al. | | |

(Continued)

OTHER PUBLICATIONS

"Resistance Change Type Humidity Sensor Units with High-Accuracy Detection and Output Control"; TDK Technology-Focused Library; 3 pages; Obtained from http://product.tdk.com/en/techjournal/tfl/sensor_actuator/CHS/.

(Continued)

*Primary Examiner* — Christle I Marshall
(74) *Attorney, Agent, or Firm* — Andrew D. Fortney; Central California IP Group, P.C.

(57) ABSTRACT

A tag or smart label including a humidity sensor, and methods of manufacturing and using the same, are disclosed. The tag or smart label includes a substrate or backplane with a battery or antenna, a humidity sensor, and an integrated circuit thereon. The integrated circuit is in electrical communication with the humidity sensor and the antenna or battery, and is configured to process a signal from the humidity sensor corresponding to the humidity level or value in the environment to be monitored, and provide or generate a signal that represents the humidity level/value. The humidity sensor includes first and second electrodes that are a predetermined distance apart, a humidity-sensitive material having one or more electrical, mechanical or chemical properties that vary as a function of the humidity level/value, and a water- and/or humidity-permeable membrane covering the humidity-sensitive material.

20 Claims, 5 Drawing Sheets

(56) References Cited

U.S. PATENT DOCUMENTS

| | | | |
|---|---|---|---|
| 2005/0137542 A1* | 6/2005 | Underhill | A61F 13/42 |
| | | | 604/361 |
| 2006/0174693 A1 | 8/2006 | Chen et al. | |
| 2006/0261946 A1 | 11/2006 | Himberger et al. | |
| 2007/0018819 A1* | 1/2007 | Streeb | G06K 7/0008 |
| | | | 340/572.1 |
| 2007/0285238 A1 | 12/2007 | Batra | |
| 2008/0220721 A1 | 9/2008 | Downie et al. | |
| 2009/0297769 A1 | 12/2009 | Yan et al. | |
| 2009/0322543 A1* | 12/2009 | Crnkovich | A61F 13/42 |
| | | | 340/604 |
| 2011/0011179 A1 | 1/2011 | Gustafsson et al. | |
| 2015/0317896 A1* | 11/2015 | Planton | G06K 19/0717 |
| | | | 340/584 |

OTHER PUBLICATIONS

"EVAL Resin & Film"; Kuraray Co., Ltd.; Mar. 2010; 23 pages; Obtained from www.eval.jp; Chiyodaku, Tokyo, Japan.

Zhi Chen and Chi Lu; "Humidity Sensors: A Review of Materials and Mechanisms"; Sensor Letters; Jul. 2005; pp. 274-295; vol. 3, No. 4.

International Search Report and Written Opinion; International Searching Authority/US dated Nov. 16, 2016; International Application No. PCT/US2016/045906; 9 pages; International Searching Authority/United States, Commissioner for Patents; Alexandria, Virginia.

International Preliminary Report on Patentability dated Feb. 15, 2018; International Application No. PCT/US2016/045906; 9 pages; The International Bureau of WIPO, Geneva, Switzerland.

* cited by examiner

HUMIDITY SENSOR, WIRELESS DEVICE INCLUDING THE SAME, AND METHODS OF MAKING AND USING THE SAME

CROSS REFERENCE TO RELATED APPLICATION

This application claims the benefit of U.S. Provisional Patent Application No. 62/201,789, filed on Aug. 6, 2015, incorporated herein by reference as if fully set forth herein.

FIELD OF THE INVENTION

The present invention generally relates to the field(s) of wireless communication and wireless devices having an integrated sensor. More specifically, embodiments of the present invention pertain to radio frequency (RF and/or RFID), near field communication (NFC), high frequency (HF) and ultra high frequency (UHF) tags and devices with an integrated humidity sensor, and methods of manufacturing and using the same.

DISCUSSION OF THE BACKGROUND

General humidity sensors in the market can be bulky devices. Polymer films such as polyvinyl alcohol (PVA) or polyvinylpyrrolidone (PVP) are known humidity sensitive layers that are also printable. However, such polymers are generally not sensitive enough to measure humidity using a low voltage power source typically found in wireless devices. Polyelectrolytes such as polystyrenesulfonic acid (PSSA), polyethylene oxide or polyaniline are also known humidity sensitive materials, but they are not soluble in typical solvents.

Techniques for polymerizing aniline with a water soluble polymer as a template have been developed to obtain water-soluble aniline copolymers. However, such copolymerization can adversely affect the sensitivity of the copolymer to water or humidity.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to radio frequency (RF and/or RFID), near field communication (NFC), high frequency (HF) and ultra high frequency (UHF) tags and devices with an integrated humidity sensor, and methods of manufacturing and using the same.

In one aspect, the present invention relates to a tag or smart label, comprising a substrate or backplane with a battery or antenna thereon, the battery or antenna providing power to other components of the tag or smart label, a humidity sensor directly or indirectly on the substrate or backplane, and an integrated circuit directly or indirectly on the substrate or backplane and in electrical communication with the humidity sensor and the antenna or battery. In exemplary embodiments, the humidity sensor comprises (i) first and second electrodes that are a predetermined distance apart, (ii) a humidity-sensitive material having one or more electrical, mechanical or chemical properties that vary as a function of the humidity level or value in an environment of the tag or smart label, and (iii) a water- and/or humidity-permeable membrane covering the humidity-sensitive material. The integrated circuit is generally configured to (i) process a first signal from the humidity sensor including data and/or information corresponding to the humidity level or value in the environment, and (ii) provide or generate a second signal that represents the humidity level or value in the environment.

In some embodiments, the present tag or smart label may further comprise a plurality of traces electrically connecting each of the components on the backplane to the integrated circuit at different sets of terminals. For example, some of the traces may electrically connect a battery or an antenna to the integrated circuit at a first set of terminals. In addition, other traces may electrically connect the humidity sensor to at least one terminal of a second set of terminals of the integrated circuit different from the first set of terminals.

The substrate or backplane may comprise or function as a gas barrier, and may comprise or consist of a food-, drug- or tobacco-compatible polymer. In some embodiments, the substrate or backplane comprises or consists of a flexible metal foil having a diffusion barrier layer thereon and a food-, drug- or tobacco-compatible oxide layer on the diffusion barrier layer.

In some embodiments, the first and second electrodes are interdigitated, and the humidity sensor has a resistivity that increases or decreases as the humidity level or value in the environment increases or decreases. In other embodiments, the first and second electrodes are plate-like, and the humidity sensor has a capacitance that increases or decreases as the humidity level or value in the environment increases or decreases. The humidity sensor may also comprise a transistor with a gate or base including a material having a conductance or resistivity that increases or decreases as the humidity level or value in the environment increases or decreases.

The tag or smart label may further comprise a pouch that sealingly encloses the backplane and the integrated circuit, and that includes a first window or opening exposing the humidity sensor to the environment. In such embodiments, the tag or smart label may further comprise an adhesive that seals the pouch around the first window or opening to the backplane and/or a peripheral region of and/or around the humidity sensor. The pouch may comprise or consist of a food-, drug- or tobacco-compatible material.

The humidity sensor may further comprise a second substrate supporting the first and second electrodes and the humidity-sensitive material, and the second substrate is affixed or adhered to the substrate or backplane. In some embodiments, the humidity sensor may further comprise (i) first and second base electrodes respectively electrically connected to the first and second electrodes, and (ii) first and second connection terminals respectively electrically connected to the first and second base electrodes. The first and second connection terminals may be electrically connected to traces to the integrated circuit.

The tag or smart label may further comprise a second sensor. The second sensor may comprise a member selected from the group consisting of a temperature sensor, one or more continuity sensors, one or more electromagnetic field sensors, one or more current sensors, one or more voltage sensors, one or more power sensors, one or more light sensors, one or more time sensors, and one or more other chemical sensors. In exemplary embodiments, the second sensor is electrically connected to the integrated circuit at a third set of terminals of the integrated circuit. Alternatively or additionally, the present tag or smart label may further comprise one or more redundant humidity sensors.

The integrated circuit may further comprise a memory. The memory includes one or more bits configured to store a value corresponding to the humidity level, and may include a plurality of bits configured to store a unique identification code for the container or package. In further or alternative embodiments, the integrated circuit may further comprise a threshold comparator receiving an output of the humidity sensor and/or an analog-to-digital converter configured to convert an analog value of the humidity level or value to a digital value.

In exemplary embodiments, the integrated circuit comprises at least one printed layer. In some embodiments, the integrated circuit comprises a plurality of printed layers. In one example, the integrated circuit comprises at least one thin film. In another example, the integrated circuit comprises a plurality of thin films.

In embodiments of the tag or smart label comprising a battery, the tag or smart label may further comprise a display and an on/off switch, each independently electrically connected to the integrated circuit. For example, the display is electrically connected to the integrated circuit at a fourth set of terminals of the integrated circuit, and the on/off switch is electrically connected to the integrated circuit at one or more fifth terminals of the integrated circuit. The third, fourth and fifth sets of terminals are different from the first and second sets of terminals. In embodiments of the tag or smart label comprising the antenna, the tag or smart label may further comprise a receiver and/or a transmitter. The antenna may receive a first wireless signal processed by the receiver, and may transmit or broadcast a second wireless signal that represents the humidity level or value of the environment in which the tag or smart label is located or placed. In various embodiments, the antenna may consist of a single metal layer, and the integrated circuit may function as a bridge or strap electrically connecting the ends of the antenna.

The present tag or smart label comprising the antenna may be part of a near field and/or radio frequency communication device. The near field and/or radio frequency communication device may comprise the transmitter (e.g., a modulator) and/or the receiver (e.g., a demodulator).

The present invention also concerns a package or container, further including the present tag or smart label on the package or container, or on packaging around the package or container. The environment to be monitored is either inside or outside the package or container, and the humidity sensor may be configured to determine the humidity level inside the package or container or outside the package or container.

In another aspect, the present invention further concerns a method of manufacturing a tag or smart label, comprising forming at least one of a battery and an antenna on a substrate or backplane, forming a humidity sensor directly or indirectly on the substrate or backplane, and forming an integrated circuit directly or indirectly on the substrate or backplane and in electrical communication with the humidity sensor and the antenna and/or battery, whichever is present. The battery, the antenna, the humidity sensor, and the integrated circuit may be the same as the battery, the antenna, humidity sensor, and integrated circuit described above. The method may further comprise forming a plurality of traces on the substrate or backplane, the traces electrically connecting the integrated circuit to the humidity sensor and to the antenna and/or battery, whichever is present.

In various embodiments, the method may further comprise forming a plurality of traces on the substrate or backplane, and the traces electrically connecting the integrated circuit to the humidity sensor and to the antenna or battery.

In some embodiments, forming the humidity sensor may comprise (i) forming the first and second electrodes on a second substrate, (ii) printing the humidity-sensitive material over and between the first and second electrodes, and (iii) forming the water- and/or humidity-permeable membrane on or over the humidity-sensitive material. Alternatively, forming the humidity sensor may comprise (i) forming the first electrode on a second substrate, (ii) printing the humidity-sensitive material on or over the first electrode, (iii) forming the second electrode on or over the humidity-sensitive material, and (iv) forming the water- and/or humidity-permeable membrane on or over the humidity-sensitive material. Forming the first and second electrodes may comprise printing the first and second electrodes. Forming the water- and/or humidity-permeable membrane may comprise printing the water- and/or humidity-permeable membrane. Forming the integrated circuit may comprise printing one or more layers of the integrated circuit (e.g., a plurality of the layers of the integrated circuit), forming a plurality of layers of the integrated circuit by one or more thin film processing techniques, or forming one or more layers of the integrated circuit by a thin film processing technique, and printing one or more additional layers of the integrated circuit.

The method may further comprise forming an additional sensor, and electrically connecting the additional sensor to a set of terminals on the integrated circuit different from the terminals to which the humidity sensor and the battery or antenna are connected. In some embodiments, the method may further comprise forming a transistor in the humidity sensor, the transistor having a gate or base including a material having a conductance or resistivity that increases or decreases as the humidity level or value in the environment increases or decreases.

The method may further comprise forming a memory including one or more bits configured to store a value corresponding to the humidity level or value and/or a plurality of bits configured to store a unique identification code for the container or package. For example, the memory may comprise one or more bits configured to store a value corresponding to the humidity level or value. Forming the memory may comprise printing at least one layer of the memory that includes the unique identification code for the container or package (or the plurality of bits configured to store the same).

The method may comprise forming the antenna, the antenna being configured to receive and/or transmit or broadcast a wireless signal. Forming the antenna may consist of forming a single metal layer on the first substrate, and etching the single metal layer to form the antenna. Alternatively, forming the antenna may comprise printing a metal ink on the first substrate in a pattern corresponding to the antenna.

The method may further comprise placing or inserting the tag or smart label into a pouch, then sealing or enclosing the pouch. The pouch may include a first window or opening exposing the humidity sensor to the environment. In such embodiments, the method may further comprise applying an adhesive to a region of the substrate or backplane around the humidity sensor and/or a region of the pouch around the first window or opening, and pressing the region of the substrate or backplane and the region of the pouch together. The pouch may comprise or consist of a food-, drug- or tobacco-compatible material.

In a further aspect, the present invention further concerns a method of determining a humidity level in an environment inside or outside a package or container, comprising placing a tag or smart label on an inner or outer surface of the package or container or of packaging around the package or container, and determining the humidity level of the environment using the integrated circuit and the humidity sensor. The battery or antenna, the humidity sensor, and the integrated circuit may be the same as the battery or antenna, humidity sensor, and integrated circuit described above.

Generally, determining the humidity level comprises determining a resistivity or capacitance across the first and second electrodes, and correlating the resistivity or capacitance to the humidity level. In some embodiments, the first and second electrodes are interdigitated, and determining the humidity level comprises determining the resistivity across the first and second electrodes, which increases or decreases as the humidity level or value in the environment increases or decreases. Alternatively, the first and second electrodes are plate-like, and determining the humidity level comprises determining the capacitance across the first and second electrodes, which increases or decreases as the humidity level or value in the environment increases or decreases. In some embodiments, the method may further comprise comparing an output of the humidity sensor to a threshold corresponding to a minimum or maximum acceptable humidity level. The humidity sensor may comprise a transistor with a gate or base including a material having a conductance or resistivity that increases or decreases as the humidity level or value in the environment increases or decreases.

In embodiments where the tag or smart label further comprises one or more redundant humidity sensors, the humidity level may be determined using one of the humidity sensor or redundant humidity sensors, or each of the humidity sensor and the redundant humidity sensors. The method may also comprise determining a temperature of the environment using a temperature sensor on the tag or smart label, and the humidity level may be further determined using the temperature.

When the tag or smart label comprises the battery, the tag or smart label may further comprise a display, and the method may further comprise displaying the humidity level on the display. When the tag or smart label further comprises an on/off switch, the method may further comprise turning on the tag or smart label prior to determining the humidity level and turning off the tag or smart label after determining the humidity level. The tag or smart label may be configured to automatically turn off a predetermined period of time after determining the humidity level. In embodiments where the tag or smart label comprises the antenna, the method may further comprise receiving a first wireless signal from a reader prior to determining the humidity level, and transmitting or broadcasting a second wireless signal including the humidity level after determining the humidity level. The antenna may consist of a single metal layer. In exemplary embodiments, the tag or smart label comprises a near field and/or radio frequency communication device.

The method may further comprises storing one or more values corresponding to the humidity level in a memory in the integrated circuit. In a further embodiment, the method further comprises periodically storing a plurality of the values in the memory. The method may further comprise reading a unique identification code for the container or package from the memory.

As a result, the present invention may expand the use and functionality of smart labels and near field communication and RF tags and devices. The novel labels, tags and devices expand the capabilities of such "smart labels" to detect humidity and monitor conditions of products such as packaged food in food and other industries during transportation and storage. These and other advantages of the present invention will become readily apparent from the detailed description of various embodiments below.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and materials have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

To implement a humidity sensor into a "smart tag" or "smart label," the following items are advantageous and/or desired:

A fully printable humidity detector that can be formed on a plastic film or substrate;

A humidity detector with high sensitivity, quick response, and operable using a low voltage or power;

Low cost; and

Durability in high humidity or condensation.

Additionally, to use smart labels in packages of certain regulated consumer products such as food, drugs and tobacco, materials and/or components of the label should be compatible with the product. Materials and components are considered food-compatible, drug-compatible or tobacco-compatible when they are not harmful to humans (or, in the case of foods and drugs for non-human animals, non-human animals). In the U.S., the U.S. Food and Drug Administration regulates and approves food- and drug-compatible materials. In the case of food-compatible and tobacco-compatible materials, such materials cannot affect the flavor (and optionally the smell) of the product. However, most plastics, electronic materials, and metals are not compatible with food products. For example, non-food-grade polymers may contain minute amounts of monomer or small molecular weight oligomers, which can affect the smell and taste of the food, and in some cases, can be harmful. It is challenging to fabricate smart labels using food compatible materials.

An Exemplary Humidity Sensor

Figure 1:
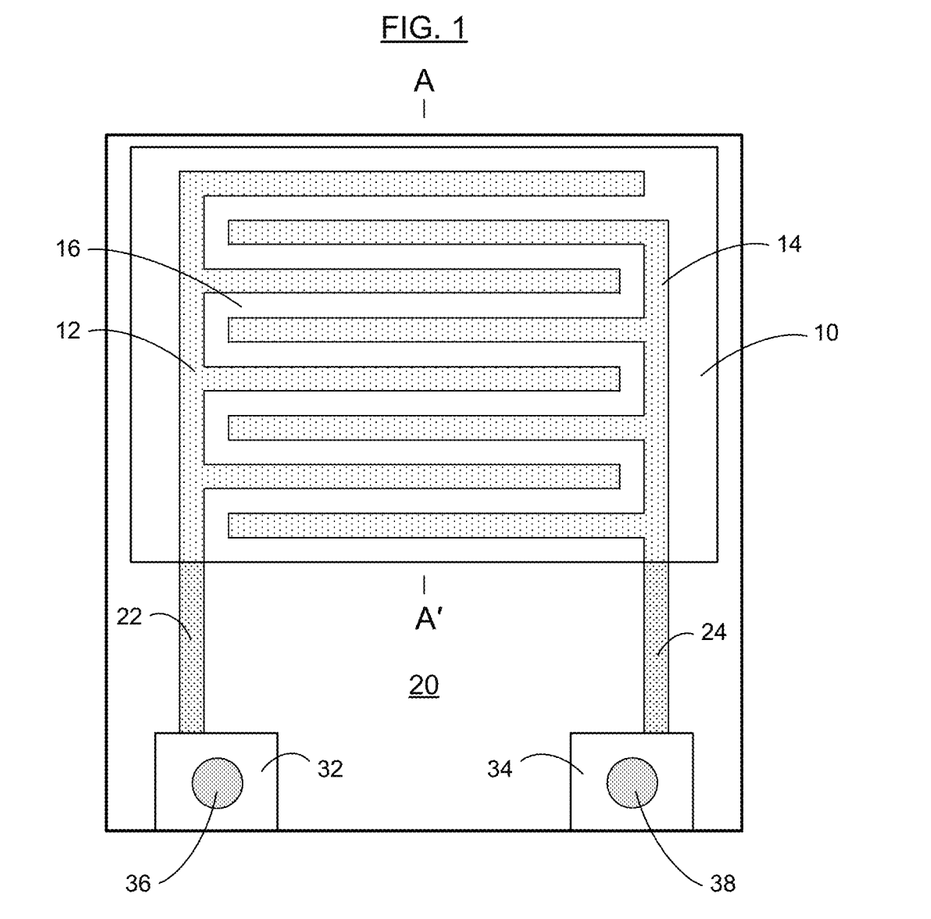
FIG. 1 shows an exemplary humidity sensor configured to sense the humidity level of the environment of a container or packaging bearing the tag, in accordance with one or more embodiments of the present invention.

FIG. 1 shows an exemplary humidity sensor 10 that includes first and second electrodes 12 and 14 on a substrate 20. A humidity-sensitive material 16 is between (and, in many cases, over) the first and second electrodes 12 and 14. First and second traces 22 and 24 on the substrate 20 extend from and electrically connect the first and second electrodes 12 and 14, respectively, to first and second connection pads 32 and 34. Solder balls or bumps 36 and 38 are respectively connected to the first and second base connection pads 32 and 34. The solder balls or bumps 36 and 38 may be used to connect the humidity sensor 10 to other components on a printed circuit board or other substrate using conductive traces (not shown in FIG. 1).

The substrate 20 may be or comprise a plastic film such as polyethylene terephthalate (PET), polyethylene naphthalate (PEN), or a polyimide. Alternatively, the substrate 20 may be or comprise a stainless steel or other metal foil (such as aluminum, titanium, coper, etc.). The metal foil may be coated with a diffusion barrier layer (e.g., such as $Ti_xN_y$, where the ratio of x to y is from about 3:4 to about 3:2, or $Ti_aAl_bN_c$, where the ratio of [a+b] to c is from about 3:4 to about 3:2), which may have a total thickness of from 300 Å to 1000 Å or more (e.g., up to about 1200 Å, 1500 Å or 2000 Å), and one or more insulating layers on the diffusion barrier layer. The insulating layer(s) may electrically isolate the diffusion barrier layer from electrical layers and/or electrical device features subsequently formed on the insulator layer(s).

The first and second electrodes 12 and 14 and the first and second traces 22 and 24 may comprise, consist essentially of, or consist of a noble or other conductive metal (e.g., copper, silver, gold, platinum, aluminum, an alloy thereof, etc.). Certain perovskite-type metal oxides (e.g., comprising or consisting essentially of ruthenium oxide) may also be suitable for use as the first and second electrodes 12 and 14. Interdigitative (e.g., comb-like) electrodes (as shown) generally measure the resistivity of the humidity sensitive layer 16. Plate-like electrodes generally measure a capacitance across the humidity sensitive layer 16. The electrodes can be fabricated by printing (e.g., screen printing, inkjet printing, gravure printing, etc.), or blanket deposition (e.g., sputtering or evaporation), patterning (e.g., by photolithography, masking, or laser patterning) and etching. The electrodes may further comprise a plating layer (e.g., of copper, silver, or gold).

Figure 2:
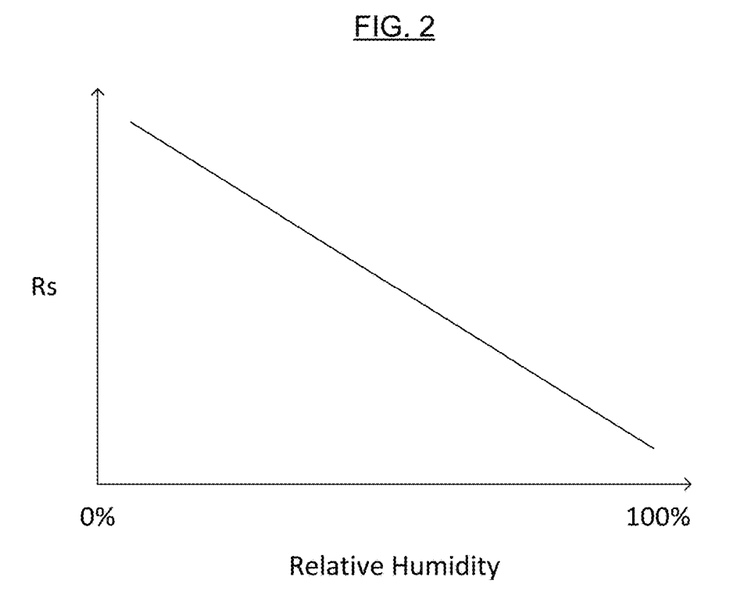
FIG. 2 is a graph showing an exemplary resistance vs. relative humidity relationship for a humidity sensor such as that of FIG. 1.

The humidity sensitive layer 16 can be or comprise one or more polymers having one or more electrical properties that vary (e.g., increase or decrease) as a function of the relative and/or absolute humidity. For example, FIG. 2 shows an exemplary graph including a curve or line that shows the resistance across the electrodes 12 and 14 (FIG. 1) as a function of the relative humidity of the environment in which the present humidity sensor 10 is placed. Ideally, the curve or line in such a graph is linear over all or substantially all of the relative humidity range (e.g., 0-100%, 0-95%, 5-95%, 10-100%, etc.), but nonlinear response curves are also within the scope of the present disclosure. Such nonlinear response curves may be part of the curve or line, or an entirety of the curve or line.

In addition, in some embodiments, the polymer(s) for the humidity sensitive layer are printable (e.g., can form a solution having certain properties suitable for printing applications, such as a viscosity within a predetermined range, a mass loading that results in a predetermined thickness and thickness uniformity, a chemical composition that does not result in adverse reactions with the substrate, electrodes or other structure or layers that the polymer[s] may contact, etc.). For example, the humidity sensitive layer can be or comprise polyaniline, poly(diethylamido methacrylate) (DEAMA), poly(butyl methacrylate) (BMA), poly(methacrylamidopropyltrimethylammonium chloride) (MAPTAC), polymethyl styrene-methacrylic acid (MSMA), poly(meth)acrylic acid and esters thereof, polyvinyl alcohol (PVA), chitin, polyvinyl acetate (PVAc), poly(vinylbenzyltributylphosphonium chloride) (VTBPC), poly (2-ethylhexyl acrylate) (EHA), poly(4-vinyl pyrolidone) (4VP), poly(methacryloyloxyethyl dimethyl propyl ammonium bromide) (MEDPAB), poly(methacryloyl-oxyethyl trimethyl ammonium chloride) (METAC), poly(acryloyloxyethyl trimethyl ammonium chloride) (AETAC), poly(2-hydroxy-3-methacryloxypropyl trimethyl ammonium chloride (HMPTAC), polystyrenesulfonic acid (PSSA), poly(sulfonic acid diphenyl aniline) (PSDA), a polyethylene glycol (PEG), poly(2-acrylamido-2-methyl-1-propanesulfonic acid) (AMPS), analogs thereof, copolymers and blends thereof, etc. The copolymers can comprise random copolymers, block copolymers, or both. The polymer may be selected based on its range of measureable resistivity change or capacitance change, the linearity of the resistivity or capacitance change curve, and/or the response time. For example, a water-soluble polyaniline-PSSA-poly(ethylene oxide) copolymer fulfills minimum requirements for a printable humidity sensor layer for a smart label.

Alternatively, the humidity-sensitive material may be or comprise an electrolyte (for example, a dry gel electrolyte, the conductivity of which increases when exposed to water or water vapor that is absorbed by the electrolyte). In embodiments in which the sensor 10 determines whether the humidity is above or below a threshold humidity level, the thresholds for the "Valid" and/or "Not Valid" state(s) can be determined empirically (e.g., using measurements of the resistance or capacitance across the electrodes taken during known relative humidity [and optionally temperature] conditions). In some embodiments, the resistance or capacitance across the electrodes may change linearly or nonlinearly with respect to a different gas or chemical such as CO, $CO_2$, $O_2$, $O_3$, etc. The sensor material(s) in/on the NFC or other wireless tag must be exposed to the environment to be monitored (e.g., inside or outside the package or container) to determine the humidity level or the "Valid/Not Valid" state of the product with respect to an environmental chemical.

The solder balls or bumps 36 and 38 and the first and second connection pads 32 and 34 generally comprise a conductive material (e.g., a metal or alloy). The material(s) of the first and second connection pads 32 and 34 may comprise a conductive metal or alloy (e.g., copper, silver, gold, aluminum, an aluminum alloy with silicon, copper and/or titanium, etc., which may be coated or alloyed with tin, palladium, or another noble metal). The first and second connection pads 32 and 34 may be formed by printing or blanket deposition, patterning and etching, as described herein. Alternatively, the first and second connection pads 32 and 34 may be or comprise a thin foil, slip or sheet of metal, such as copper, aluminum, aluminum alloy, or steel (e.g., stainless steel), which can be connected to the first and second traces 22 and 24 and adhered to the substrate 20 using an anisotropic conductive paste, optionally together with a conventional non-conductive adhesive in the areas between the substrate 20 and the pads 32 and 34. The material(s) of the solder balls or bumps 36 and 38 may comprise a tin alloy (e.g., with bismuth, silver, copper, zinc, indium, etc.), and may further comprise an adhesive resin. Some materials that include both a solder alloy and a resin may be referred to as "self-alignment adhesive with solder," or SAAS. One such SAAS resin is a SAM resin ([e.g., SAM10 resin, available from Tamura Corporation, Osaka, JP; this and/or other SAAS and/or SAM resins are available from Panasonic Corporation, Tokyo, JP; Namics Corporation, Niigata City, JP; and Nagase & Co., Ltd., Tokyo, JP). The connection terminals 36 and 38 may be joined or adhered to the first and second connection pads 32 and 34 by heating, which may cause the adhesive resin to separate spontaneously from the solder ball/bump. Such resins are designed to assemble small electrical devices, and can simultaneously form a conductive bump and an adhesive on the substrate for securing the bump to the substrate.

Figure 3:
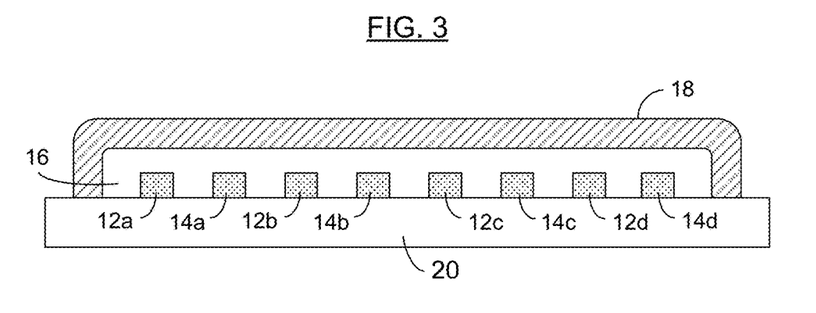
FIG. 3 shows a cross-section of the exemplary humidity sensor of FIG. 1 along the A-A' line, in accordance with one or more embodiments of the present invention.

FIG. 3 shows a cross-section of the humidity sensor 10 of FIG. 1. The cross-section shows that the humidity sensor 10 may be a low profile humidity sensor (e.g., having a relatively small thickness). The cross-section of FIG. 3 also shows that the humidity sensor 10 may further include a penetration layer 18. The penetration layer 18 is a layer of one or more materials through which water (in the gas or liquid state) can penetrate, but other molecules that may affect the resistivity or capacitance of the humidity sensor 10 generally do not. In various embodiments, the penetration layer 18 comprises a polymer that is printable (e.g., it can be formulated into an ink composition that can be printed onto the substrate 20 and/or the humidity sensitive layer 16. The polymer for the penetration layer 18 may be or comprise a homopolymer, a copolymer, which may be a random copolymer or a block copolymer, or a blend of homopolymer(s) and/or copolymer(s). For example, penetration layer 18 may comprise an ethylene-vinyl alcohol copolymer.

An Exemplary Smart Label Including a Humidity Sensor

Figure 4:
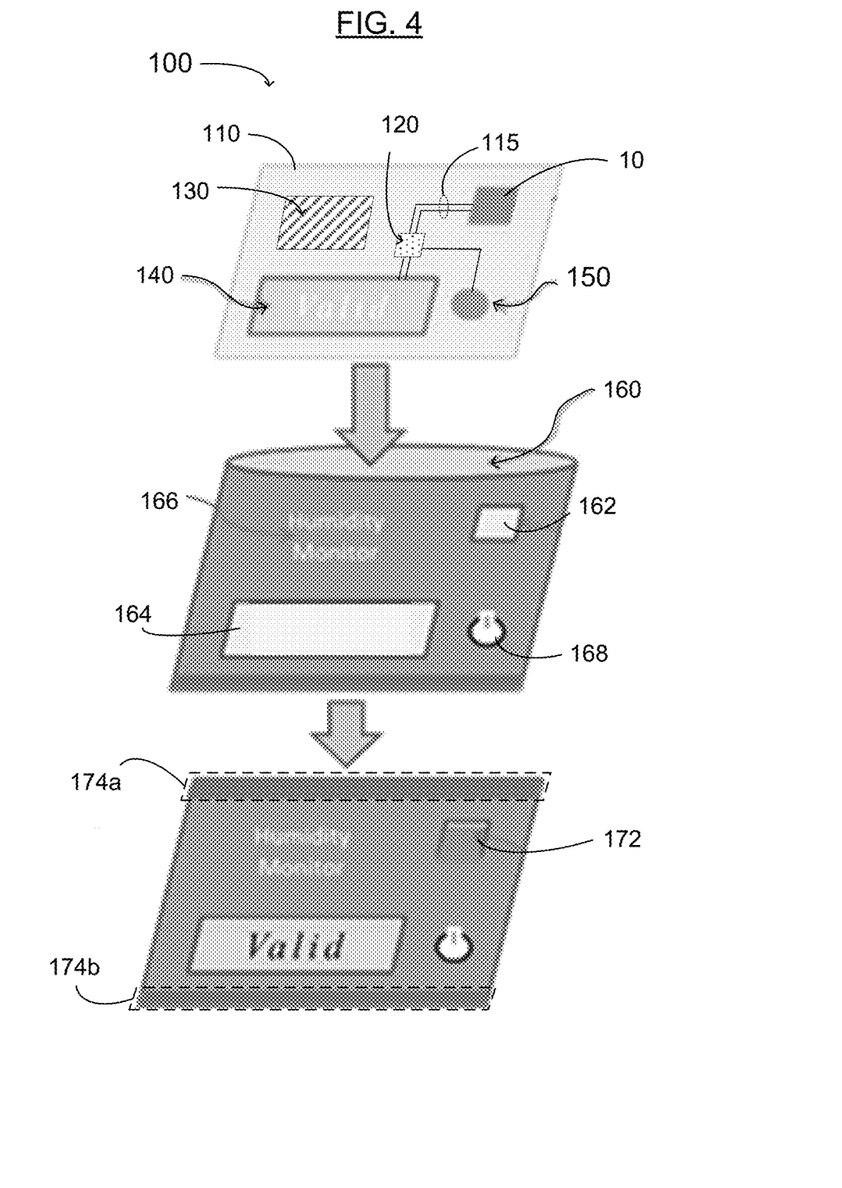
FIG. 4 shows an exemplary battery-powered smart tag/label with the exemplary humidity sensor thereon and a process for sealing the smart tag/label in a pouch compatible with humidity-sensitive products, such as certain food, drug or tobacco products, in accordance with one or more embodiments of the present invention.

FIG. 4 shows an exemplary smart label 100 for food, drug or tobacco packaging, having a humidity sensor 10 therein, and exemplary methods of making the same and using the same to sense or detect a humidity level inside a package or container, or in the environment outside a package or container. The smart label 100 includes a backplane or substrate 110, the humidity sensor 10, an integrated circuit 120, a battery 130, a display 140, and a push switch 150. The humidity sensor 10 is generally the same as that shown in FIG. 1, but may further detect temperature and/or another environmental parameter in addition to humidity. The backplane 110, integrated circuit 120, battery 130, display 140, and push switch 150 are generally conventional. The combination of components on the smart label 100 and its packaging inside a partially water-permeable or water vapor-permeable pouch 160 is considered novel. The present smart label can be applied to many different types of product containers (e.g., lidded boxes for jewelry, watches, cosmetics, etc., alcohol bottles, cigarette and cigar packages, shipping packages such as overnight courier envelopes and boxes, etc.).

The smart label backplane 110 may be or comprise a plastic film such as PET, PEN, or a polyimide. The backplane 110 generally includes or functions as a gas barrier, to isolate the environment to be monitored for humidity (i.e., inside or outside the container or packaging) from the other environment. Traces 115 on the backplane 110 may be or comprise a metal such as silver, aluminum, copper etc., or an alloy thereof The traces 115 may be printed or formed by blanket deposition, patterning and etching, and may have conventional surface finishing performed thereon. Traces 115 are shown between the IC 120 and the sensor 10, display 140, and push switch 150, but similar traces may also connect terminals of the battery 130 to the IC 120, the sensor 10, the display 140, and optionally the push switch 150. The backplane 110 may further include one or more discrete components such as resistors, capacitors and thermistors, connected to one or more of the IC 120, the sensor 10, the display 140, and/or the push switch 150, and used in a conventional manner.

Figure 5:
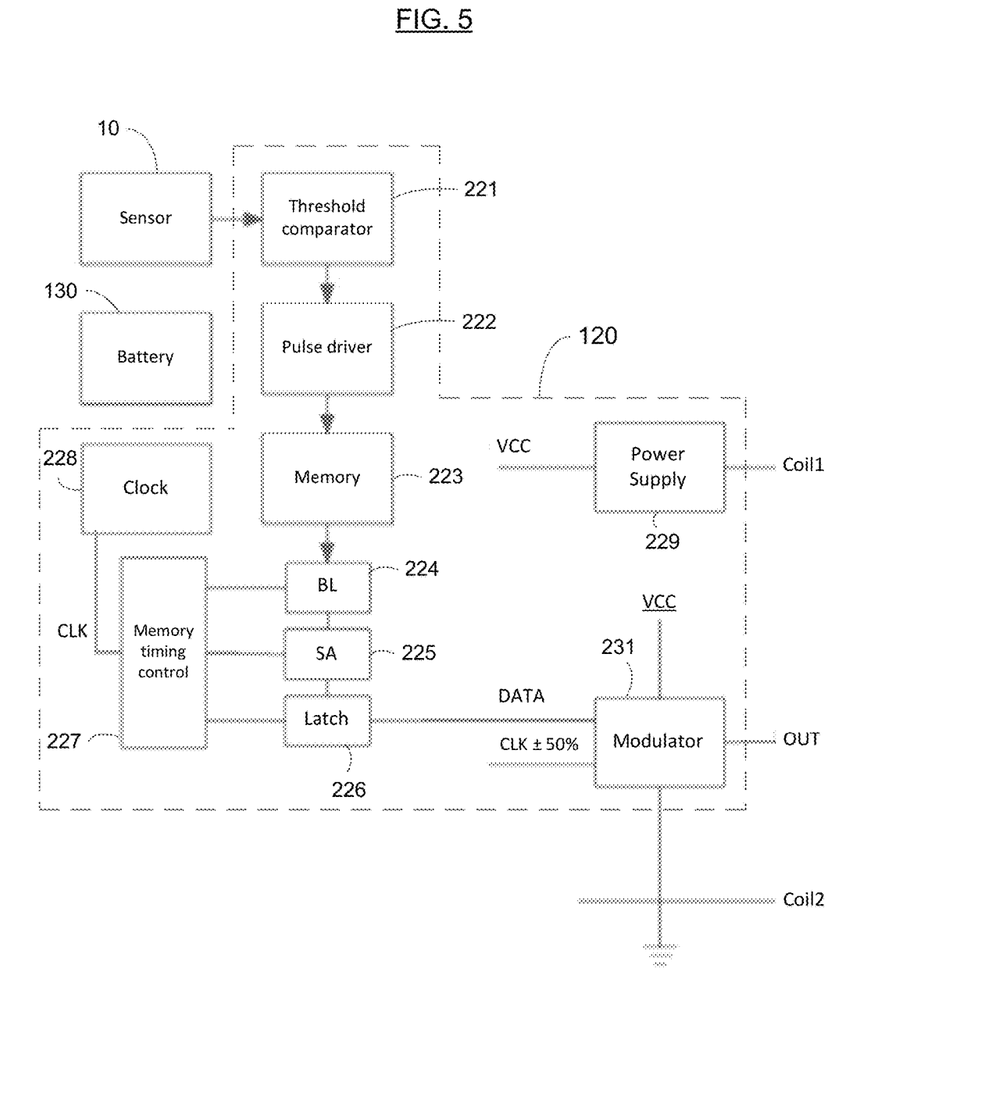
FIG. 5 shows an exemplary integrated circuit for use in the present NFC/RF tag, in accordance with one or more embodiments of the present invention.
Figure 6:
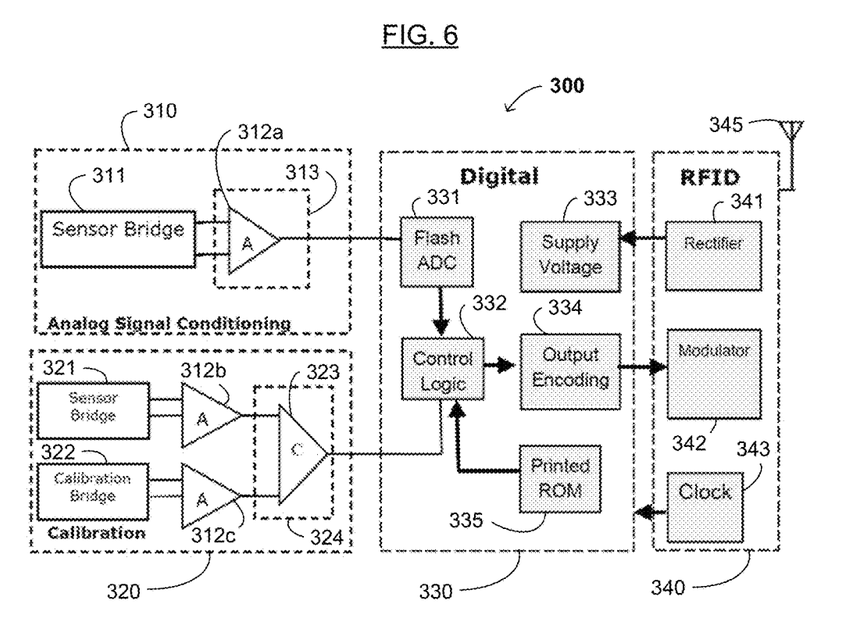
FIG. 6 shows an exemplary alternative integrated circuit for use in the present NFC/RF tag.

The IC 120 in the smart label 100 may be or comprise a printed integrated circuit (PIC). The PIC 120 generally includes at least one layer formed by printing (e.g., screen printing, inkjet printing, gravure printing, laser patterning, etc.). Printed integrated circuitry and methods of making the same are disclosed in U.S. Pat. Nos. 7,687,327, 7,767,520 and 8,796,125 and U.S. Pat. Appl. Publ. No. 2007/0273515 (IDR0272, IDR0502, IDR0742, IDR0813), the relevant portions of which are incorporated herein by reference. Examples of IC functionality suitable for use in the present invention are shown in FIGS. 5-6 and discussed in more detail below.

The display 140 may be a relatively simple monochromatic display, configured to display relatively simple data (e.g., a 2-digit number corresponding to the sensed relative humidity) and/or one of a limited number of messages (e.g., "Valid" or "Not Valid," depending on the value of the humidity relative to a predetermined minimum or maximum humidity threshold). Alternatively, the smart label 100 may further comprise an antenna (not shown in FIG. 4) configured to output or broadcast a signal carrying humidity data to be displayed on the display of a different device (e.g., a smart phone or a pad or tablet computer).

The battery 130 may be a conventional battery for use on a plastic backplane 110. The battery 130 enables the smart label 100 to be read real-time, at any time, without a specifically-configured reader, and to determine and store humidity (and, in some examples, temperature and other environmental data) over time. Such historical data is useful for accurately determining or estimating an expiration date or "freshness status" (e.g., "Best," "Good," "Acceptable," "Unacceptable," etc.) for the product in the container or packaging. In some embodiments, the battery 130 is or comprises a printed battery (see, e.g., International Pat. Publ. No. WO 2012/037171, the relevant portions of which are incorporated herein by reference).

As is shown in the center drawing in FIG. 4, after the smart label 100 in placed in a sealable pouch 160, the pouch 160 is sealed with food-, drug- or tobacco-compatible glue 174 around part or all of the periphery or edge of the pouch 160. The pouch 160 may also function as a gas barrier between the smart label 100 and the ambient environment, except for the humidity sensor 10. The humidity sensor 10 is exposed to the ambient environment through an open window 162 in the pouch 160. The ambient environment may be inside or outside the packaging or container on or in which the smart label 100 is placed. Alternatively, the humidity sensor 10 may be connected to the backplane 110 with one or more metal pins or crimping, from outside the pouch 160.

The pouch 160 can also be heat-sealable and comprise or consist essentially of a food-, drug- or tobacco-compatible gas barrier polymer film such as poly(ethylene-vinyl alcohol) (EVAL). In one embodiment, the pouch 160 comprising an EVAL film (e.g., commercially available from Kuraray Co., Ltd., Tokyo, Japan) functions as a gas barrier, but is permeable to water vapor (i.e., humidity). Such EVAL films or sheets generally have a thickness of about 10-100 μm (e.g., 15 μm), and when the EVAL films or sheets have such a thickness, the EVAL pouch 160 may further include a gas-permeable support (e.g., a conventional food-compatible paper, glass paper, cloth, etc.). In such a case, the open window 162 exposing the sensor is not necessary, but the sensor may need additional time to stabilize when sensing the humidity level inside or outside the container. Because the entire pouch (including the area of the "open" window 162) includes the EVAL film, it is not necessary for the sensor 10 to be made of food-compatible materials. In any/all embodiments, the pouch 160 may also have an inner lining of sputtered or evaporated metal (e.g., aluminum).

The pouch 160 generally has a transparent window or cut-out 164 for viewing the display 140. The pouch 160 around the window or cut-out 164 is sealed to the smart label 100 around the area of the humidity sensor 10 using glue or other adhesive 172. The glue 172 may be applied to the backplane 110 around the periphery of the humidity sensor 10 before the smart label 100 is placed in the pouch 160. Alternatively, the humidity sensor 10 may be adhered to the outside of the pouch 160, and the window 162 may expose ends or leads of the traces 115 to which the connection terminals 36 and 38 (see FIG. 1) are connected. Optional printing and/or graphics 166 may be on the humidity sensor 10 that indicate(s) information about the smart label 100 and/or the food / tobacco product(s) within the packaging, the location 168 of the push switch 150, etc. The printing or graphics 166 is formed on the pouch 160 using a food-, drug- or tobacco-compatible ink.

The pouch 160 with the smart label 100 sealed therein may be adhered to the inside or outside of a container or packaging using glue strips 174. The glue strips 174 and the glue 172 may comprise a food-grade, drug-grade or tobacco-grade polyvinyl alcohol, starch, or hot-melt adhesive. When sealed on the outside of the container or packaging, the glue 174 is on the underside of the pouch (i.e., the external surface of the pouch 160 facing away from the window 164 for the display 140, the window 162 for the sensor 10, and the push switch indicator 168). The sensor 10 then senses the humidity level in the environment surrounding the container or packaged product.

When the pouch 160 is sealed on the inside of the container or packaging, the glue 174 is on the same surface of the pouch 160 as the window 164 and the push switch indicator 168. When the pouch 160 is secured to the inside surface of transparent or translucent packaging (e.g., a thin plastic wrapper or film), the humidity sensor 10 and the window 162 may face towards the interior of the packaging, and the sensor 10 then senses the humidity level inside the packaged product. In such embodiments, the backplane 110 may have through-holes or vias for the traces 115 filled or lined with a conductive material (e.g., a metal or metal alloy) to connect to the sensor 10 on the side of the backplane 110 opposite from the display 140.

When the pouch 160 is secured to the inside surface of a container comprising a stiff, non-transparent material (e.g., a metal, paperboard or cardboard box), the container may have a window or cutout for access to the smart label (e.g., to push the switch 150 and/or access the display 140), and may be on a relatively stiff backing or support material (e.g., paperboard having a predetermined minimum weight) attached to the inside of the container. Alternatively, to sense the humidity inside such a container, the smart label 100 may be placed on the outside of the container, and the container may have a window or opening over which the humidity sensor 10 is placed, so that the humidity sensor 10 can be exposed to the interior of the container.

Exemplary Wireless (e.g., NFC and/or RF) Device(s)

FIG. 5 shows an exemplary near field communication (NFC) and/or RF device (e.g., an NFC tag) according to embodiments of the present invention, including integrated circuitry 120, a battery 130, and a sensor 10 suitable for the exemplary smart label 100 of FIG. 4. The device generally comprises a substrate or backplane (not shown), an integrated circuit (IC) 120, an antenna (not shown, but designated by connection terminals "Coil1" and "Coil2") in communication with the IC 120, and a sensor 10 in separate communication with the IC 120 and that provides one or more signals to the IC 120. Optionally, the NFC device can also have one or more additional sensors in separate communication with the IC 120 (see, e.g., FIG. 6). This structure and/or device architecture is also applicable to radio frequency (RF) devices, such as RFID tags, high frequency (HF) devices such as roll readers, very high frequency (VHF) devices, ultra high frequency (UHF) devices, etc.

As shown in FIG. 5, the IC 120 may include a threshold comparator 221 receiving information (e.g., a signal) from the sensor 10, a pulse driver 222 receiving an output of the threshold comparator 221, a memory 223 storing sensor data from the pulse driver 222, one or more bit lines (BL) 224 for reading data from the memory 223, one or more sense amplifiers (SA) 225 for converting signal on the bit line(s) 224 to digital signals, a latch 226 for temporarily storing data from the sense amplifier(s) 225, and a transmitter (e.g., modulator) 231 configured to output data (including identification code) from the device. Alternatively, the IC 120 may comprise an analog-to-digital converter (not shown), in place of or in addition to the threshold comparator 221. The exemplary IC 120 in FIG. 5 also contains a clock 228 configured to provide a timing signal (e.g., CLK) that controls the timing of certain operations in the IC and a memory timing control block or circuit 227 that controls the timing of memory read operations. The modulator 231 also receives the timing signal (CLK) from the clock circuit 228, or a slowed-down or sped-up variation thereof The exemplary IC also includes a power supply block or circuit 229 that provides a direct current signal (e.g., VCC) to various circuits and/or circuit blocks in the IC 120. In various embodiments, the power supply block or circuit 229 comprises one or more rectifiers (e.g., a rectifying diode, one or more half-bridge or full-bridge rectifiers, etc.). The memory 223 may also contain identification code. The portion of the memory 223 containing identification code may be printed. The IC 120 may further contain a receiver (e.g., a demodulator; not shown), one or more tuning or storage capacitors (not shown), etc. Terminals in the modulator 231 and the power supply 229 are connected to ends of the antenna (e.g., at Coil1 and Coil2).

Referring again to FIG. 5, the memory 223 in the NFC and/or RFID tag may contain a fixed number of bits. In some implementations, NFC and/or RFID tag tags may contain $m*2^n$ bits, where m is a positive integer and n is an integer of at least 3 (e.g., 24, 32, 48, 64, 128, 256 or more bits). Some bits are allocated to overhead (non-payload) data for format identification and data integrity (CRC) checking. The payload of the device consumes the remainder of the bits. For example, the payload can be up to $(m-p)*2^n$ bits, where p is a positive integer <m (e.g., 96 bits in the case where $m*2^n=128$ bits and up to 224 bits in the case where $m*2^n=256$ bits).

The payload of the NFC and/or RFID tag can be allocated to variable amounts of fixed ROM bits (which are generally—but not always—used as a unique identification number). When print methods are used in manufacturing the NFC and/or RFID tag, the ROM bits are permanently encoded and cannot be electrically modified. Any payload bits that are not allocated as fixed ROM bits can be allocated as dynamic sensor bits. These sensor bits can change values, based on a sensed input. Different splits or allocations between ROM and sensor bits are indicated by data format bits that are part of the non-payload or 'overhead' bits, generally in the first $2^n$ bits (or $2^{n-q}$ bits, where q is a positive integer <n, such as 16 bits in the case where $m*2^n=128$ or 256) of the NFC and/or RFID tag memory.

As shown in FIG. 1, the sensor 10 in the present tag may be or comprise a material that becomes more or less conductive, or that has a higher or lower dielectric constant, based on exposure to water vapor (e.g., inside or outside the package or container). In some embodiments, a transistor (e.g., receiving the sensor output at one source/drain or emitter/collector terminal and a "sensor enable" signal at the gate or base, or which can be diode-wired and receive the sensor signal at both a source/drain or emitter/collector terminal and at the gate or base) may modulate the signal from the sensor 10 to the IC 120. The threshold voltage of the diode-wired transistor may be configured to function as a built-in threshold for the humidity sensor 10.

An example of a non-linear transistor the threshold voltage or conductivity of which changes upon absorption of the chemical is one that has an electrolyte in the gate that leads to a large signal swing in dry conditions as compared to humid conditions. When the gate comprises such an electrolyte, most or substantially all of the field is over the electrolyte (which works as dielectric under dry conditions). Thus, an n-TFT including such an electrolyte in the gate is in the "off" state even when an "on" voltage is applied to the gate. Under humid conditions, the electrolyte conducts, the field is over the gate dielectric, and the n-TFT is on upon application of an "on" voltage. In one example, a dry lithium polymer electrolyte (e.g., suitable for battery applications) may be printed (e.g., using an R2R-capable printing method) as the gate of such a transistor. In an alternative embodiment, the lithium may be replaced with zinc ions, and/or the electrolyte may be another electrolyte suitable for battery applications (see, e.g., WO 2012/037171, published Mar. 22, 2012 and/or U.S. Pat. Appl. Publ. No. 2013/0280579, the relevant portions of which are incorporated herein by reference.)

Particularly useful electrolytes for use in the present invention include polymer electrolytes (i.e., an electrolyte that contains a salt that is dissolved in a solvating polymer matrix). Polyethylene oxide (PEO) is a good ion conductor, especially for protons and other small cations, and is often used in polymer electrolytes for this reason. The polymer can conduct or transport ions but is not itself conductive, so ions in the form of salts (e.g., lithium perchlorate, $LiClO_4$) are generally added. However, some electrolyte materials may be hygroscopic (e.g., PEO), so water from the surroundings absorbed by the hygroscopic electrolyte material(s) may dissociate (e.g., into $H_3O^+$ and $OH^-$ ions) and contribute to (ion) conductivity. The absorbed water can also have an effect on the ion mobility, and thus the ion conductivity, of the polymer electrolyte.

Other electrolytes suitable for use in the present invention include polyelectrolytes. Polyelectrolytes are materials that have ionic groups in the repeating unit, which means that one of the ions is bound to the polymer chain (i.e., is immobile) and the counter-ion is free to move (i.e., is mobile). Polyelectrolytes include polycations and polyanions, in which the mobile ion is an anion (−) or a cation (+), respectively. These types of materials are usually hygroscopic. Typically, they need water or another solvent that enables mobility of the mobile ion in order to dissociate. As a result, they are good candidates for use in humidity or water sensing applications.

When polyelectrolytes are dry, they contain few mobile ions (which may also have low mobility). The (ionic) resistance of the material is relatively high. When the water content increases, more ions become mobile, and the mobility of these ions generally also increases. In other words, the ionic conductivity increases. Polymer electrolytes, on the other hand, are often conductive when they are dry. However, the number of mobile charge carriers (ions) and the mobility of the ions can potentially increase with increased water content, thus also giving an increased ionic conductivity upon absorption of water.

Polyanionic polyelectrolytes such as polystyrene sulfonic acid (PSSA/PSSH/PSS), polyacrylic acid (PAA), polyvinyl phosphonic acid (PVPA), and copolymers thereof can be used in organic thin film transistors (OTFTs) with good results. It is believed that such polyelectrolytes are sufficiently hygroscopic that they retain sufficient water to keep the ionic conductivity (or capacitance) at a high level, even at low relative humidity. However, the polyelectrolyte can dry out, reducing the ionic conductivity, under certain circumstances. For example, experiments have shown that an OTFT including a poly(vinyl phosphonic acid-acrylic acid) copolymer (P[VPA-AA]) polyelectrolyte, placed in an airflow with dry nitrogen (as opposed to an ambient, air-containing environment), results in the drain current dropping dramatically as compared to the same OTFT in the ambient, air-containing environment.

For example, in certain pharmaceutical products, a container (e.g., blister pack), bottle or jar may contain a drug or other component that is sensitive to humidity. The present sensor detects the presence of liquid water or water vapor in the environment of the product (either internal or external, depending upon the placement of the smart label), and the sensor and IC sense or determine whether the product has been exposed to an environment in which the humidity has been uncontrolled (e.g., is above a predetermined maximum relative humidity). In one embodiment in which the IC includes clock or timing circuitry, the sensor and IC sense or determine whether the product has been exposed to an environment in which the humidity has been uncontrolled for more than a predetermined threshold maximum period of time.

The present NFC/RF tag may include one or more additional sensors in addition to the present humidity sensor. For example, the present tag (or smart label) may further include a temperature sensor, a continuity sensor, one or more electromagnetic field sensors, one or more current/voltage/power sensors, one or more light sensors, or one or more other chemical sensors (e.g., for oxygen, carbon monoxide, carbon dioxide, nitrogen oxides, sulfur dioxide and/or tri-oxide, ozone, one or more toxins, etc.). The present IC 120 may also include one or more time sensors (e.g., configured to count or determine elapsed time), including the clock circuit (which can also be a basis for a real-time clock) and one or more counters, dividers, etc., as is known in the art. The leads from any additional sensor should be connected to the IC 120 at terminals separate from those for the antenna (when present) and for the humidity sensor. Such additional sensors are generally on the same part of the package or container as the IC. The additional sensor(s) can be used in an "AND"-type function with the humidity sensor (e.g., the IC and sensors sense that the container or its contents have been exposed to humidity and temperature levels beyond certain predefined thresholds), or in an "OR"-type function with the humidity sensor (e.g., the IC and sensors sense that the container or its contents have been exposed to a humidity or a temperature beyond the corresponding predefined threshold). One skilled in the art can easily derive logic and applications for such functionality and/or capability.

The wireless read function (e.g., the NFC feature) is always available in the implementation shown in FIG. 5. In this implementation, the NFC data will indicate to the reader (smartphone, USB reader, etc.) the unique ID number of that NFC and/or RFID tag (which can be used for everything from mobile marketing, loyalty, and discounts/cross-sell offers to supply chain tracking, tax tracking for governments, and providing specific product manufacturing information such as lot no., manufacturing date, etc.), and when a continuity sensor is present, can also indicate whether the protected product is factory sealed / unopened (and therefore contains genuine product) or has been opened or compromised (and therefore contents are suspect if delivered to the consumer in that state). Thus, in some embodiments, it may be beneficial to locate the antenna (and optionally, the IC) a sufficient distance away from any interface at which the container or packaging can be opened to reduce or minimize the risk of inadvertent damage to the antenna (and optionally the IC) from opening the container.

By preserving the ability to read the tag both before opening and after opening (with the added dimension of reading whether the container has been opened), it is possible to continue NFC-based interaction(s) with the user after the product has been opened. For example, pharmaceuticals, cosmetics, certain alcoholic beverages, and even food products like olive oil can be opened and used for days, weeks, months, or even years. By preserving the functionality of the NFC and/or RFID tag during this time, the consumer can communicate with the manufacturer regarding the specific product bearing the NFC tag and the conditions under which the product has been stored, before and after opening.

Applications that read NFC and/or RFID tag tags are generally connected to cloud servers that collect information about the IDs that are read. This is to log data for analysis and to serve the correct experience and/or provide accurate information to the consumer's smartphone or other NFC- and/or RF-capable device. When an 'opened' state is first read and processed by the cloud system, it will automatically trigger alerts (and potentially trigger investigation) if that ID is ever read again with a 'closed' or 'sealed' state. That helps to ensure the integrity of the overall system.

In addition, NFC and/or RF devices (e.g., readers) and/or cloud systems can recognize this change in the continuity state and provide a differentiated experience when users interact with the NFC and/or RFID tag attached to the protected product or package after opening. For example, a closed product might trigger a consumer and/or user experience related to the evaluation and purchase of the product (e.g., in a retail environment), while an opened product might trigger information about how to properly use the product (e.g., by providing recipes in the case of food products, expiration dates and/or special instructions for use in the case of pharmaceutical products, etc.) and/or opportunities to instantly order related products or to reorder the same product, etc.

The antenna can be printed (e.g., using printed conductors such as, but not limited to, silver from a silver paste or ink) or manufactured using conventional methods like etched aluminum (e.g., by sputtering or evaporating aluminum on a substrate such as a plastic film or sheet, patterning by low-resolution [e.g., 10-1,000 μm line width] photolithography, and wet or dry etching). In order to electrically isolate the antenna coil from the continuity sensor(s), the antenna may be patterned on the opposite side of the substrate material from the continuity sensor(s). The antenna can be sized and shaped to match any of multiple form factors, while preserving compatibility with the 13.56 MHz target frequency of the NFC reader hardware.

The invention can be applied broadly to all RFID tags (not just HF/NFC/13.56 MHz tags), including RFID tags operating at frequencies higher or lower than 13.56 MHz (e.g., in the high frequency [HF] range [3-30 kHz], very high frequency [VHF] range [30-300 kHz], and ultra high frequency [UHF] range [300-3000 kHz]), especially in the case where the RFID tag has the ability or functionality to accept external sensor input(s) and communicate the same when read by an RFID reader adapted to read such a tag.

An Exemplary Method of Making a Smart Label with a Humidity Sensor

The present invention also concerns a method of manufacturing a tag or smart label, comprising forming a humidity sensor on a substrate or backplane, forming an integrated circuit (IC) on the same or different substrate, and electrically connecting the humidity sensor to a set of terminals of the IC. The method may further comprise forming a battery and/or an antenna on the same or different substrate as each other, as well as the IC and/or the humidity sensor. The battery and/or antenna are each connected to a set of terminals of the IC different from each other and from the humidity sensor. When the IC, humidity sensor and/or battery are formed on a different substrate from the others, the different substrates may be physical and electrically connected to a substrate in common with at least one of the others (i.e., one or both of the remaining members of the group consisting of the IC, the humidity sensor and the battery).

In various embodiments, the smart label includes the battery and optionally a display. Thus, the method of manufacturing may further comprise forming the battery and/or the display on the substrate or backplane, or alternatively, attaching the battery (on a different substrate) and/or the display (on yet a further substrate) on the substrate or backplane. In other embodiments, the tag is a wireless communication device that comprises a near field or radio frequency communication device (i.e., with an antenna configured to receive and send near field or RF signals). In one example, the wireless device is an NFC device, such as an NFC tag.

Additional embodiments of the method may further comprise forming one or more additional sensors on a substrate, as described herein. The additional sensor(s) may be formed on the same substrate as the humidity sensor, the battery or the IC, or on a different substrate.

In the present method of making a tag or smart label, forming the integrated circuit may comprise printing one or more layers of the integrated circuit. Printing offers advantages over photolithographic patterning processes, such as low equipment costs, greater throughput, reduced waste (and thus, a "greener" manufacturing process), etc., which can be ideal for relatively low transistor-count devices such as near field, RF and HF tags. Thus, in some cases, the method may comprise printing a plurality of the layers of the integrated circuit.

Alternatively, the method may form the integrated circuit by a process that comprises forming a plurality of layers of the integrated circuit by one or more thin film processing techniques. Thin film processing also has a relatively low cost of ownership, and is a relatively mature technology, which can result in reasonably reliable devices being manufactured on a wide variety of potential substrates. In some embodiments, the best of both approaches can be used, and the method may form one or more layers of the integrated circuit by one or more thin film processing techniques, and printing one or more additional layers of the integrated circuit.

Furthermore, as described herein, the integrated circuit may further comprise a threshold comparator or analog-to-digital converter configured to receive an output of the humidity sensor, a memory including one or more bits configured to store a value or state corresponding to the humidity of the environment inside or outside the container or package, and/or any of the other circuits or circuit blocks disclosed herein. For example, the memory may include a further plurality of bits configured to store a unique identification code for the container or package. In such a case, forming the memory may comprise printing at least one layer of the memory that includes the plurality of bits configured to store the unique identification code (e.g., to form a hard-wired ROM, similar to a mask ROM).

In some embodiments, forming the antenna may consist of forming a single metal layer on the first substrate, and etching the single metal layer to form the antenna. Alternatively, forming the antenna may comprise printing a metal ink on the first substrate in a pattern corresponding to the antenna. In some relatively advantageous embodiments, the antenna consists of a single common metal layer on a common substrate, and the IC is formed or made in a manner enabling the IC to function as a strap or bridge between the terminals of the antenna (e.g., on a separate substrate or interposer that is positioned over the loops of the antenna), and thus electrically connect the terminals of the antenna to the IC. This allows for use of an antenna that consists of a single patterned metal layer.

An Alternative Wireless Communication Device with a Humidity Sensor

Figure 7:
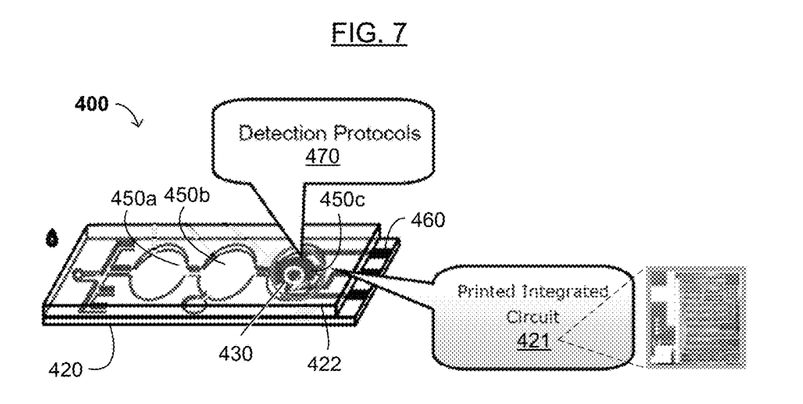
FIG. 7 shows an exemplary alternative wireless tag with multiple sensors, suitable for use in the present invention.

FIGS. 6-7 show wireless communication devices (e.g., NFC or RFID tags) with one or more humidity sensors, one or more sensor interface circuits, and an integrated circuit coupled to one or more antennas on a substrate for communicating with a wireless reader. In some embodiments, the wireless communication device may further comprise an integrated display.

A sensor tag or label 400 with multiple sensor elements (or sensor arrays) 450*a-c*, as shown in FIG. 7, including the present humidity sensor, can be used for the detection of a humidity level (e.g., relative humidity) and one or more chemical species and/or one or more environmental parameters such as temperature, electromagnetic field or brightness (light), or as redundant sensors for the detection of the same chemical species (e.g., water vapor). Thus, the multiple sensor array 450*a-c* can include multiple copies of the same sensor or different types of sensors, as may be desired for a given application. In exemplary embodiments, the sensor tag or label 400 may include a printed integrated circuit 421 coupled to one or more antennas 460 on a substrate 420.

Examples of additional chemical sensors the properties of which change upon absorption of the chemical can include hydrogels and/or dry gels with a physical matrix that contains one or more analyte-sensitive fluorophores or electrophores (e.g., an alcohol-, CO- or NO-sensitive fluorophore) dispersed therein. More specifically, examples of such chemical sensors include analyte-sensitive fluorophores in a sol-gel matrix or film, and thermochemical sensors (the temperature of which changes upon a reaction with the analyte, or with the chemical or substance in the container, in which the temperature change is determined by calorimetry).

It may also be desirable to print different sections of an individual sensor element 450*a*, 450*b* or 450*c* with different types of metal-specific seed layers, then plate different metals (e.g., Pd, Au, Ag, etc.) on the different seed layers. For example, this approach provides part of the sensor element with a Pd electrode/sensor element and part with an Au or Ag electrode/sensor element, in essence creating a multisensor array within a sensor element. This also provides unique current signatures, for example, depending on the surface treatment of the electrode. For example, the reaction or binding of the chemical species with or to different metals, and the amount or relationship(s) of the different metals in the sensor element, can affect the current signature on the electrode surface.

Integrating a sensor 311 and/or 321 with a local amplifier 312 and/or other analog signal conditioning circuit(s) (e.g., temperature compensation, drift, offset, etc.) as shown in the analog signal conditioning block 310 and/or sensor calibration block 320 of FIG. 6 can increase sensor performance by improving the signal-to-noise ratio, for example, resulting in a lower rate of false positive results.

By using multiple sensor elements 450a-c as shown in FIG. 7, coupled to a local comparator (e.g., comparator 323) as shown in the comparator block 324 in the calibration block 320 of FIG. 6), each sensor (including the humidity sensor) can be calibrated on-board, rather than using conventional lot calibration methods. The calibration block 320 also includes an on-board sensor 321 and a calibration bridge 322, each outputting one or more signals to an amplifier 312*b* and 312*c*, respectively. By comparing a control value or a control sensor element (e.g., the output from the calibration block 320) with actual readings, the comparator 323 can also be used as a built-in expiration mechanism or product quality control mechanism for the product(s) within the labeled packaging.

The coupling of the humidity sensor interface circuit to an analog-digital converter (ADC; e.g., flash ADC 331) as shown in the digital logic block 330 of the interface circuit 300 of FIG. 6 allows humidity sensor data to be transmitted via NFC or RF wireless communication protocol(s) using the output encoder 334 and RFID block 340. By integrating the NFC, RF and/or RFID function(s) onto the tag, any NFC or RF signal-based reader or device (e.g., an NFC-enabled smart/cellular phone or tablet computer) can be used to send sensor results to anyone. By using such an NFC- or RF-enabled device, a wireless interne data management system (without the need for an additional sensor reader) is possible. In addition, an on-board ROM (e.g., a flash memory [not shown] or printed ROM 335 as shown in the digital logic block 330 of the interface circuit 300 of FIG. 6) can be printed (in part or in its entirety) and/or placed in or on the IC to provide a unique ID, eliminating possible human transcription and/or sample ID errors, as well as providing an anti-counterfeit ID (see, e.g., U.S. patent application Ser. No. 11/544,366, filed on Oct. 6, 2006, and U.S. Pat. No. 8,758,982, the relevant portions of which are incorporated herein by reference). The digital logic block 330 may further include control logic 332 that receives signals from the ADC 331, the sensor calibration block 320 and the printed ROM 335, and provide data and/or instructions to the output encoder 334. A wireless output signal can be generated by the output encoder 334 and provided to a modulator 342 in the near field and/or radio frequency communication (RFID) block 340. The RFID block 340 may also include a clock circuit or timing circuitry 340 to control the timing of various operations and optionally track a period of time that the package or container (or the contents therein) are exposed to a particular environment.

It is also envisioned that a printed display (using TFT technology as described in U.S. Pat. Nos. 7,687,327, 7,701, 011, 7,767,520 and/or 8,796,125, the relevant portions of which are incorporated herein by reference) can be integrated into the tag (e.g., multi-sensor tag 400, FIG. 7), thereby enabling the tag to display the humidity sensor results without the need for a sensor reader. For example, the printed display may be an electrochromic display. The TFT technology described in U.S. Pat. Nos. 7,687,327, 7,701, 011, 7,767,520 and/or 8,796,125 can also be used to form the integrated circuit, a rectifier 341 (e.g., for powering the tag from a wireless signal from the reader), and/or circuitry and/or traces in the humidity sensor.

An Exemplary Method of Sensing Humidity

The present invention further concerns a method of sensing or determining a humidity level in or around a package or container, comprising placing a tag or smart label on or in the package or container, and sensing a humidity level of an environment inside or outside the package or container using a humidity sensor and an integrated circuit in the tag or smart label. The tag or smart label comprises the humidity sensor, an integrated circuit (IC) electrically connected to the humidity sensor, and a battery or antenna electrically connected to the IC. In various embodiments, the tag or smart label further comprises a display configured to show the humidity level (e.g., as a relative humidity value or as a "Valid"/"Not Valid" state), and the method further comprises displaying the humidity level on the display. Alternatively or additionally, the tag or smart label further comprises an additional sensor, such as a temperature sensor, and the method further comprises determining a temperature of the environment and calculating the relative humidity from the temperature and the resistance or capacitance across the electrodes of the humidity sensor.

As described herein, the tag or smart label can be placed on the inside or the outside of the package or container such that the humidity sensor is exposed to the environment inside or outside the package or container to be monitored. In embodiments in which the tag or smart label further include a push switch or other on/off type switch, the switch may be electrically connected to the IC, and the method may further comprise activating the switch before sensing the humidity level, and deactivating the switch after sensing or displaying the humidity level.

The sensed humidity information enables a user and/or supplier of the food, drug or tobacco product to increase the accuracy of the shelf life and other expiration/spoilage date estimates for the product(s) within the package or container. Alternatively, the humidity state inside or outside the package or container can indicate to the user that the product in the package or container exceeds a predetermined threshold known or likely to cause damage or spoliation of the product. This improves the safety of the product and allows user and manufacturers to communicate with each other and share information relating to the product before and after opening the package or container.

As described elsewhere herein, the integrated circuit may further comprise a threshold comparator receiving an output of the humidity sensor, a memory including one or more bits configured to store a value corresponding to the humidity level of the container or package, and/or any other circuit or circuit block disclosed herein. Consequently, the method of sensing the humidity level may further comprise comparing the resistance or capacitance across the electrodes of the humidity sensor to one or more reference values corresponding to the threshold(s), storing data relating to the sensed humidity level in the memory, and/or reading data relating to the sensed humidity level from the memory. When the humidity level is a "Valid"/"Not Valid" state, only one bit of memory is needed to store the humidity level information. However, when the humidity level is for example a two-digit relative humidity value, the memory may store, e.g., from 4 to 7 bits of relative humidity data. When the method further comprises determining a temperature of the environment to which the humidity sensor is exposed, the memory may also store, e.g., from 5 to 8 bits of temperature data, and/or the memory may include a look-up table that correlates the measured resistance/capacitance from the humidity sensor to a relative humidity value at the measured temperature.

In some examples, the memory includes a plurality of bits configured to store a unique identification code for the container or package. In such examples, the memory may comprise at least one printed layer in the plurality of bits configured to store the unique identification code, and the method may further comprise reading the unique identification code from the memory. This information enables the supplier and/or manufacturer to track a freshness or spoliation state of a food, drug or tobacco product from the packaging process to its eventual consumption (e.g., the point at which the package or container is opened and discarded or destroyed).

CONCLUSION/SUMMARY

The present invention provides a wireless communication device or a battery-powered display device with an integrated sensor that advantageously expands the use and functionality of smart labels and near field communication and RF tags and devices. For example, the wireless communication device, display device, labels and tags expand the capabilities of "smart labels" to detect humidity and monitor conditions of products such as packaged food and pharmaceutical products during transportation and storage. The present device includes printed structures such as a printed humidity detector that advantageously lower costs associated with manufacturing equipment, while increasing throughput and reducing waste.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. A tag or smart label, comprising:
   a) a substrate or backplane with a battery or antenna thereon, said battery or antenna providing power to other components of said tag or smart label;
   b) a humidity sensor directly or indirectly on said substrate or backplane, said humidity sensor comprising (i) first and second electrodes that are a predetermined distance apart, (ii) a humidity-sensitive material having one or more electrical, mechanical or chemical properties that vary as a function of said humidity level or value in an environment of said tag or smart label, and (iii) a water- and/or humidity-permeable membrane covering said humidity-sensitive material; and
   c) an integrated circuit directly or indirectly on said substrate or backplane and in electrical communication with said humidity sensor and said antenna or battery, said integrated circuit configured to (i) process a first signal from said humidity sensor including data and/or information corresponding to an analog value of said humidity level or value in said environment, and (ii) provide or generate a second, digital signal that represents said analog value of said humidity level or value in said environment.

2. The tag or smart label of claim 1, further comprising a plurality of traces electrically connecting said battery or antenna to said integrated circuit at a first set of terminals, and said humidity sensor to at least one terminal of a second set of terminals of said integrated circuit different from said first set of terminals.

3. The tag or smart label of claim 2, comprising said battery, and further comprising a display electrically connected to said integrated circuit at a third set of terminals, and an on/off switch electrically connected to said integrated circuit at one or more fourth terminals of said integrated circuit.

4. The tag or smart label of claim 1, further comprising a pouch that sealingly encloses said backplane and said integrated circuit, wherein said pouch further includes a first window or opening exposing said humidity sensor to said environment.

5. The tag or smart label of claim 4, further comprising an adhesive that seals said pouch around said first window or opening to said backplane and/or a peripheral region of and/or around said humidity sensor.

6. The tag or smart label of claim 4, wherein said pouch comprises or consists of a food-, drug- or tobacco-compatible material.

7. The tag or smart label of claim 1, wherein said humidity-sensitive material has a conductance or resistivity that increases or decreases as said humidity level or value in said environment increases or decreases.

8. The tag or smart label of claim 1, wherein said humidity sensor further comprises a second substrate supporting said first and second electrodes and said humidity-sensitive material, and said second substrate is affixed or adhered to said substrate or backplane.

9. The tag or smart label of claim 8, wherein said humidity sensor further comprises (i) first and second base electrodes respectively electrically connected to said first and second electrodes, and (ii) first and second connection terminals respectively electrically connected to said first and second base electrodes, wherein said first and second connection terminals are electrically connected to traces to said integrated circuit.

10. The tag or smart label of claim 1, wherein said integrated circuit further comprises a second sensor selected from the group consisting of a temperature sensor, one or more continuity sensors, one or more electromagnetic field sensors, one or more current sensors, one or more voltage sensors, one or more power sensors, one or more light sensors, one or more time sensors, and one or more other chemical sensors.

11. The tag or smart label of claim 1, wherein said integrated circuit further comprises a memory configured to store a value corresponding to said humidity level and/or a unique identification code for said container or package.

12. The tag or smart label of claim 1, wherein said substrate or backplane (i) comprises or functions as a gas barrier and (ii) comprises or consists of a food-, drug- or tobacco-compatible polymer.

13. A method of manufacturing a tag or smart label, comprising:
   a) forming at least one of a battery and an antenna on a substrate or backplane, said at least one of said battery and said antenna providing power to other components of said tag or smart label;
   b) forming a humidity sensor directly or indirectly on said substrate or backplane, said humidity sensor comprising (i) first and second electrodes that are a predetermined distance apart, (ii) a humidity-sensitive material having one or more electrical, mechanical or chemical properties that vary as a function of said humidity level or value in an environment of said tag or smart label, and (iii) a water- and/or humidity-permeable membrane covering said humidity-sensitive material; and
   c) forming an integrated circuit directly or indirectly on said substrate or backplane and in electrical communication with said humidity sensor and said at least one of said antenna and said battery, said integrated circuit configured to (i) process a first signal from said humidity sensor including data and/or information corresponding to an analog value of said humidity level or value in said environment, and (ii) provide or generate a second, digital signal that represents said analog value of said humidity level or value in said environment.

14. The method of claim 13, further comprising forming a plurality of traces on said substrate or backplane, said traces electrically connecting said integrated circuit to said humidity sensor and to said at least one of said antenna and said battery.

15. The method of claim 13, wherein forming said humidity sensor comprises (i) forming said first and second electrodes on a second substrate, (ii) printing said humidity-sensitive material over and between said first and second electrodes, and (iii) forming said water- and/or humidity-permeable membrane on or over said humidity-sensitive material.

16. The method of claim 13, wherein forming said humidity sensor comprises (i) forming said first electrode on a second substrate, (ii) printing said humidity-sensitive material on or over said first electrode, (iii) forming said second electrode on or over said humidity-sensitive material, and (iv) forming said water- and/or humidity-permeable membrane on or over said humidity-sensitive material.

17. The method of claim 13, further comprising placing or inserting said tag or smart label into a pouch, then sealing or enclosing said pouch, said pouch including a first window or opening exposing said humidity sensor to said environment.

18. A method of determining a humidity level in an environment inside or outside a package or container, comprising:
  a) placing a tag or smart label on an inner or outer surface of said package or container or of packaging around said package or container, said tag or smart label comprising:
    i) a substrate or backplane with a battery or antenna thereon, said battery or antenna providing power to other components of said tag or smart label;
    ii) a humidity sensor directly or indirectly on said substrate or backplane, said humidity sensor comprising (i) first and second electrodes that are a predetermined distance apart, (ii) a humidity-sensitive material having one or more electrical, mechanical or chemical properties that vary as a function of said humidity level or value in an environment of said tag or smart label, and (iii) a water- and/or humidity-permeable membrane covering said humidity-sensitive material; and
    iii) an integrated circuit directly or indirectly on said substrate or backplane and in electrical communication with said humidity sensor and said antenna or battery, said integrated circuit configured to (i) process a first signal from said humidity sensor including data and/or information corresponding to an analog value of said humidity level or value in said environment, and (ii) provide or generate a second, digital signal that represents said analog value of said humidity level or value in said environment; and
  b) using said integrated circuit and said humidity sensor, determining said humidity level of said environment.

19. The method of claim 18, wherein determining said humidity level comprises determining a resistivity or capacitance across said first and second electrodes, and correlating said resistivity or capacitance to said humidity level.

20. The method of claim 18, wherein said integrated circuit comprises a memory configured to store one or more values corresponding to said humidity level and/or a unique identification code for said container or package, and said method further comprises storing said one or more values in said memory and/or reading said unique identification code from said memory.

* * * * *